(12) United States Patent
Heise

(10) Patent No.: US 9,989,071 B2
(45) Date of Patent: Jun. 5, 2018

(54) FASTENER ARRANGEMENT FOR HYDRAULIC UNIT

(71) Applicant: CONTINENTAL TEVES AG & CO. OHG, Frankfurt (DE)

(72) Inventor: Andreas Heise, Erzhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 497 days.

(21) Appl. No.: 14/370,148

(22) PCT Filed: Dec. 7, 2012

(86) PCT No.: PCT/EP2012/074773
§ 371 (c)(1),
(2) Date: Jul. 1, 2014

(87) PCT Pub. No.: WO2013/104469
PCT Pub. Date: Jul. 18, 2013

(65) Prior Publication Data
US 2015/0004023 A1    Jan. 1, 2015

(30) Foreign Application Priority Data

Jan. 11, 2012   (DE) .................. 10 2012 200 318
Mar. 21, 2012   (DE) .................. 10 2012 204 526

(51) Int. Cl.
*F04B 53/22*   (2006.01)
*F04D 29/60*   (2006.01)
(Continued)

(52) U.S. Cl.
CPC ............ *F04D 29/605* (2013.01); *B60T 8/368* (2013.01); *F04B 53/22* (2013.01); *F16B 25/0031* (2013.01); *F16B 37/005* (2013.01)

(58) Field of Classification Search
CPC .. F16B 37/002; F16B 37/005; F16B 25/0031; F16B 25/0047; F16B 25/0078;
(Continued)

(56) References Cited

U.S. PATENT DOCUMENTS 1,651,881 A * 12/1927 Frickey ............... F04D 7/06
                                                     415/112
3,569,700 A *  3/1971 Quinn ................ G03B 42/021
                                                     378/171
(Continued)

FOREIGN PATENT DOCUMENTS

DE        78 16 556 U1    9/1978
DE         7816556 U1 *   9/1978
(Continued)

OTHER PUBLICATIONS

English machine translation of JP01072437A dated Mar. 17, 1989.*
(Continued)

*Primary Examiner* — Nathan Zollinger
(74) *Attorney, Agent, or Firm* — RatnerPrestia

(57) ABSTRACT

The invention relates to a hydraulic unit including a motor housing for receiving components of an electric motor; having a pump housing for receiving components of a pump, which is driven in order to pump a pressure medium from the electric motor, the pump housing having at least one through-bore for fixing the motor housing to the pump housing by a screw; and having a control device which is arranged on the pump housing face opposite the motor housing. A retaining region for the screw is provided in the through-bore of the pump housing for the purpose of an efficient attachment, the retaining region having an inner thread which is cut or tapped into the retaining region by the thread of the screw during the screw-in process.

13 Claims, 1 Drawing Sheet

(51) Int. Cl.
*F16B 37/00* (2006.01)
*F16B 25/00* (2006.01)
*B60T 8/36* (2006.01)

(58) Field of Classification Search
CPC ........ F16B 25/005; F04B 39/14; F04B 53/22; B60T 8/368; B60T 8/4031
USPC ................ 411/107, 301; 29/525.11; 417/360
See application file for complete search history.

(56) References Cited

U.S. PATENT DOCUMENTS

| | | | | | |
|---|---|---|---|---|---|
| 3,746,472 | A | * | 7/1973 | Rupp | .................. F04D 15/0263 277/320 |
| 3,996,834 | A | * | 12/1976 | Reynolds | ............... B21D 53/24 411/436 |
| 4,032,806 | A | * | 6/1977 | Seely | ........................ B25F 5/02 310/50 |
| 4,095,375 | A | * | 6/1978 | Klebe | ..................... B24B 23/04 451/357 |
| 4,205,947 | A | * | 6/1980 | Ruhl | ....................... F02M 37/08 29/888.02 |
| 4,527,960 | A | * | 7/1985 | DeSisto | .................... A47L 5/22 417/368 |
| 6,227,816 | B1 | * | 5/2001 | Breuer | .................. F04C 2/3446 417/132 |
| 6,260,582 | B1 | * | 7/2001 | Trautmann | .............. B60T 8/368 137/884 |
| 7,174,998 | B2 | * | 2/2007 | Pringle | ................... F04C 2/102 184/6.28 |
| 2004/0166002 | A1 | * | 8/2004 | Lanfredi | ................. F04B 1/128 417/360 |

FOREIGN PATENT DOCUMENTS

| | | | |
|---|---|---|---|
| DE | 1997 16 187 | A1 | 10/1998 |
| DE | 197 32 038 | A1 | 1/1999 |
| DE | 199 27 400 | A1 | 12/1999 |
| DE | 199 16 985 | A1 | 10/2000 |
| DE | 10 2009 039 994 | A1 | 4/2010 |
| EP | 0 882 632 | A2 | 12/1998 |
| EP | 0 975 500 | B1 | 11/2002 |
| EP | 1 772 334 | A2 | 4/2007 |
| JP | 01072437 | A * | 3/1989 ........... H01H 71/025 |
| WO | WO 00/46089 | | 8/2000 |

OTHER PUBLICATIONS

International Search Report for PCT/EP2012/074773 dated Mar. 21, 2013.
Written Opinion of the International Searching Authority (Supplemental Sheet) for PCT/EP2012/074773 dated Mar. 21, 2013.

* cited by examiner

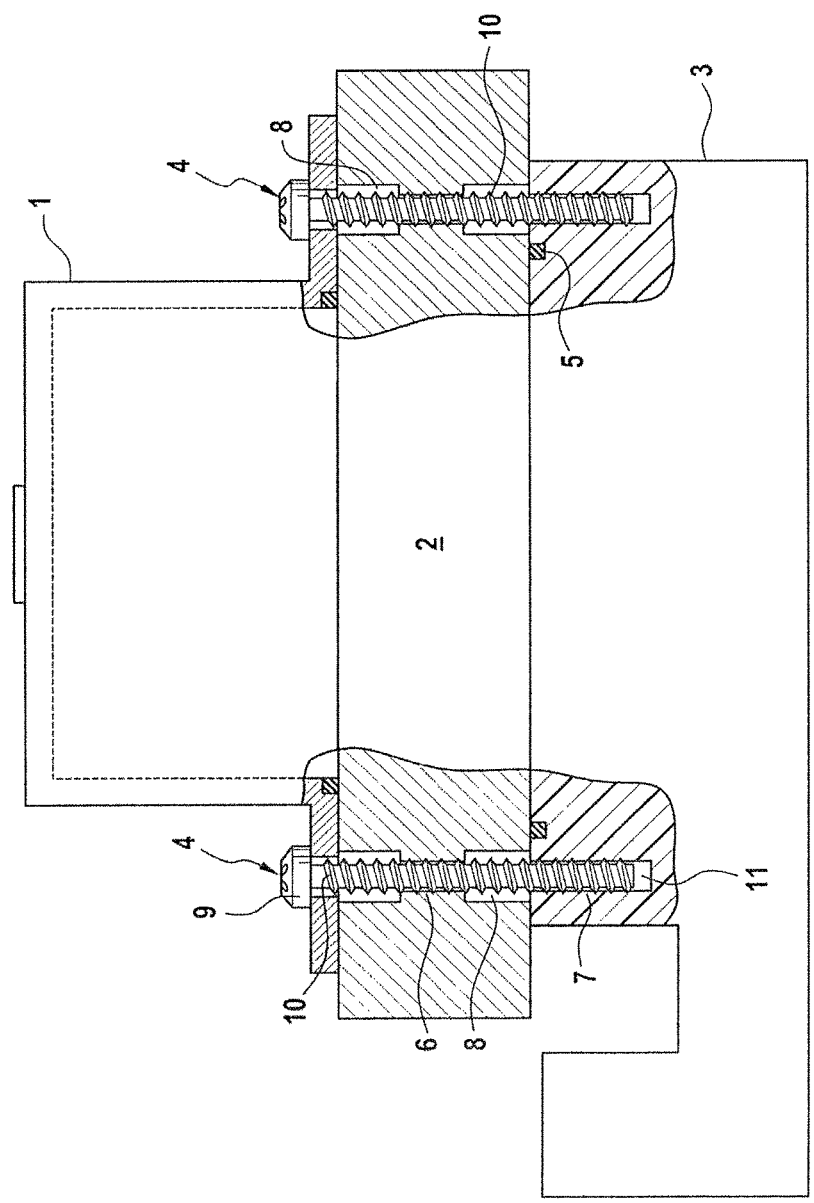

FASTENER ARRANGEMENT FOR HYDRAULIC UNIT

CROSS REFERENCE TO RELATED APPLICATIONS

This application is the U.S. National Phase Application of PCT/EP2012/074773, filed Dec. 7, 2012, which claims priority to German Patent Application Nos. 10 2012 200 318.5, filed Jan. 11, 2012 and 10 2012 204 526.0, filed Mar. 21, 2012, the contents of such applications being incorporated by reference herein.

FIELD OF THE INVENTION

The invention relates to a hydraulic unit having a motor housing for accommodating components of an electric motor and having a pump housing for accommodating components of a pump, which is driven by the electric motor in order to pump a pressure medium, having at least one through hole in the pump housing for fastening the motor housing on the pump housing by a screw, and having a control device, which is arranged on the opposite side of the pump housing from the motor housing.

BACKGROUND OF THE INVENTION

EP 0 975 500 B1, which is incorporated by reference, describes a hydraulic unit having a motor housing for accommodating components of an electric motor and having a pump housing for accommodating components of a pump, which is driven by the electric motor in order to pump pressure medium, having at least one through hole in the pump housing for fastening the motor housing on the pump housing by means of a screw, and having a control device, which is arranged on the opposite side of the pump housing from the motor housing. To screw the control device to the motor and pump housings, the control device has a threaded bushing, which is fixed in the control device housing, which is produced from plastic. The need to use threaded bushings and the fixing of the threaded bushing in the control device represents a disadvantage in terms of production engineering.

SUMMARY OF THE INVENTION

An aspect of the present invention now consists in specifying a hydraulic unit which allows particularly efficient fastening of the motor housing to the pump housing by means that are as simple, economical and functionally reliable as possible, wherein the chosen fastening should also be unrestrictedly suitable for fixing the control device on the pump housing if desired or required.

According to an aspect of the invention, this is achieved for a hydraulic unit of the type indicated by means of a retaining region the screw is provided in a through hole, said retaining region having an internal thread produced in the retaining region by the thread of the screw during the screw-in process.

BRIEF DESCRIPTION OF THE DRAWING

Further features and advantages of the invention are explained below by means of the description of an illustrative embodiment with reference to a drawing.

FIG. 1 illustrates a hydraulic unit in accordance with an aspect of the present invention.

DETAILED DESCRIPTION OF THE INVENTION

In a schematic representation, FIG. 1 shows a hydraulic unit consisting of a motor housing 1 for accommodating components of an electric motor and having a pump housing 2 for accommodating components of a pump, which is driven by the electric motor in order to pump pressure medium, having a respective through hole arranged in the pump housing 2 on each side of the motor housing 1 for fastening the motor housing 1 on the pump housing 2 by means of two screws 4, and having a control device 3, which is arranged on the opposite flange side of the pump housing 2 from the motor housing 1.

For efficient fastening of the subassemblies described, the invention envisages that a retaining region 6 for the associated screw 4 is provided in each case in one of the two through holes 8 in the pump housing 2, for which purpose an internal thread is produced in the retaining region 6 directly by the thread of the screw 4 during the process of screwing in the screw, said thread preferably coming into being by a forming action of the screw 4 associated with minimum swarf formation or by a cutting action of the screw 4 during the screwing-in movement into the retaining region 6. To provide additional fastening of the control device 3 on the pump housing 2, each screw 4 preferably extends into a further retaining region 7 within the control device 3, with the result that, similarly to the fastening of the motor housing 1 on the pump housing 2, the control device 3 too is fixed on the pump housing 2 in a single operation as the screws 4 are screwed in. Similarly to the pump housing 2, the further retaining region 7 provided in the housing of the control device 3 also has respective internal threads automatically cut or preferably formed by the thread 10 of the screw 4 during the process of screwing the screw 4 into the further retaining region 7, with the result that each screw 4 produces an internal thread in the retaining region 7 of the control device 3 in a particularly advantageous manner by the operating principle of a self-forming or cutting screw, said internal thread ensuring the required connection between the screw 4 and the retaining region 7. In accordance with the selected illustrative embodiment, each further retaining region provided in the edge region of the control device 3 has a blind hole 11, into which the associated screw 4 extends into the control device 3 by means of its self-forming or self-cutting thread 10.

Owing to the distribution of the fastening forces of the screws 4 between the retaining region 6 in the pump housing 2 and the further retaining region 7 in the control device 3, there is no overloading of the internal thread, especially in the internal thread that is generally produced directly by a self-forming or self-cutting action in a plastic housing of the control device 3 by the screws 4, resulting in particularly low-cost and yet reliable fastening of the control device 3 on the pump housing 2. The infeed of the screws 4 which is required for the basic positioning of the motor housing 1 on the pump housing 2 is ensured by the retaining region 6 in the pump housing 2, for which purpose the retaining region 6 of the pump housing 2 is manufactured in a particularly economical way in terms of production engineering from a light metal, preferably from an extruded aluminum section, whereas the further retaining region 7 of the control device 3 is composed in a particularly low-cost way from the plastic already mentioned.

A particularly reliable mechanical connection between components is obtained if an adhesive joint is provided between the motor housing 1 and the pump housing 2 in addition to the described screwed connection of the motor housing 1 to the pump housing 2. Similarly, an adhesive joint is provided between the pump housing 2 and the control device 3 if desired or required, in addition to the described screwing of the pump housing 2 to the control device 3, and it may be possible to release this adhesive joint again, depending on the properties of the adhesive joint chosen, in order to allow individual subassemblies to be replaced. With a view to the required insensitivity to spray of the hydraulic unit, the adhesive joint is embodied as a sealed joint with corresponding impermeability to liquid.

As an alternative or as a supplementary measure to the adhesive joint described, respective inserted seals 5 between the motor housing 1 and the pump housing 2 and between the control device and the pump housing 2, in the grooves running around the motor housing 1 and the housing of the control device 3, are conceivable in accordance with the illustration in FIG. 1, whereby an optimum sealing action is achieved. The use of a sealing and adhesive compound (e.g. silicone) applied in liquid form is likewise possible instead of the inserted seals 5.

The invention thus shows a screwing technique which allows the motor housing 1 on the pump housing 2 and the control device 3 on the pump housing 2 to be connected to one another in a feed process suitable for automation since the control device 3 and the motor housing 1 are merely placed on the two diametrical flange surfaces of the pump housing 2 and are held securely on the pump housing 2 by screwing in the two screws 4 in succession in the screw-in direction, with the result that the motor housing 1 is first of all fixed in its final position on the pump housing 2 by the two screws 4 before the continuous thread on the screws 4 penetrates into the further retaining region 7 of the control device 3 in order to fix the control device 3 on the pump housing 2.

The fastening concept described is suitable both for motor housings and/or control device housings which are provided with inserted seals or with seals that are applied by dispensing or sticking.

In summary, the fastening concept presented envisages that the screws 4 in the pump housing 2 ensure the preloading force for pulling the motor housing 1 against the pump housing 2 in an internal thread self-formed/cut in the pump housing 2 by the screws 4, and that, in the plastic housing of the control device 3, in holes or blind holes which are not necessarily pre-produced, the same screws 4 fix the control device housing, which has already been moved into position during the assembly process, permanently in said position with a thread-forming action.

By means of the screw heads 9, the screws 4 thus move the motor housing 1 against the pump housing 2, without a preload, for the purpose of basic positioning, and the plastic housing of the control device 3 is finally placed against the pump housing 2, without a preload, for the purpose of basic positioning by means of the thread ends of the screws 4, which press or cut into the further retaining region 7 of the plastic housing as the screws 4 are screwed in.

For this purpose, the screws 4 have a continuous thread 10 with a constant thread pitch, wherein the screws 4 can have a stepped diameter if desired or required. Adhesive bonding of the motor housing 1 and/or the control device housing to the pump housing 2 leads to a high strength in the adhesive joint after the adhesive dries.

During the production process, it is relatively easy to align the control device 3 relative to the pump housing 2 and to press it against the pump housing 2 while the screws 4 are being screwed in.

Aids, e.g. clips or assembly clamps, which hold the motor housing 1 in position on the pump housing 2 during repair or replacement of the control device 3, at least for the duration of the screwing process, in order inter alia to compress the seal sufficiently, represent a relatively low outlay here.

Finally, the special features of the threads 10 provided on the screws 4 will be discussed briefly, these being self-forming or self-cutting, depending on the thread geometry chosen. The essential difference between a self-forming and a self-cutting thread 10 is that no significant thread swarf is formed in the case of a self-forming thread 10 as the screw 4 is screwed into the retaining region 6, 7, as compared with the self-cutting thread 10, and therefore self-forming screws 4 are to be preferred owing to the smaller amount of material removed. According to FIG. 1, the inside dimension of the through hole 8 and the inside dimension of the blind hole 11 are each reduced in inside diameter relative to the nominal size of the blind hole and of the through hole to allow unhindered formation of the threads in the respective retaining regions 6, 7.

The adhesive joint between the motor housing 1 and the pump housing 2, which is provided in addition to the screwed basic positioning of the motor housing 1 on the pump housing 2, proves particularly advantageous in the context of the invention since the adhesive bonding force in the adhesive joint is greater than the force transmitted by the screw 4 to the retaining region 6 for the basic positioning of the motor housing 1 on the pump housing 2. Similarly, an adhesive joint is provided between the pump housing 2 and the control device 3 in addition to the screwed basic positioning of the control device 3 on the pump housing 2, and, here too, the adhesive bonding force in the adhesive joint is greater than the force transmitted by the screw 4 to the further retaining region 7 for the basic positioning of the control device 3 on the pump housing 2.

LIST OF REFERENCE SIGNS 1 motor housing
2 pump housing
3 control device
4 screw
5 inserted seal
6 retaining region
7 retaining region
8 through hole
9 screw head
10 thread
11 blind hole

The invention claimed is:

1. A hydraulic unit having a motor housing for accommodating components of an electric motor and having a pump housing having at least one through hole in the pump housing for fastening the motor housing on the pump housing by a screw, and having a substrate, which is arranged on the opposite side of the pump housing from the motor housing, wherein a retaining region for the screw is provided in the at least one through hole, said retaining region formed from a light metal and having an internal thread produced in the retaining region by the thread of the screw during the screw-in process, the at least one through hole including through hole portions having a larger diameter than a diameter of the retaining region on both sides of the retaining region, the screw not producing an internal thread in the through hole portions having the larger diameter, and wherein a further retaining region for the screw is provided in the substrate, the further retaining region formed from a plastic.

2. The hydraulic unit as claimed in claim 1, wherein, after the placement of the motor housing on the pump housing, the screw is introduced through an opening in the motor housing and screwed without a preload into the retaining region within the pump housing by its thread, the purpose being exclusively the basic positioning of the motor housing on the pump housing.

3. The hydraulic unit as claimed in claim 1, wherein, after the placement of the substrate on the pump housing, the screw is screwed without a preload through the retaining region provided in the pump housing and into the further retaining region within the substrate by its thread in order to ensure basic positioning of the substrate on the pump housing.

4. The hydraulic unit as claimed in claim 3, wherein the screw is provided with a self-forming or self-cutting thread, which is in engagement with the further retaining region of the substrate.

5. The hydraulic unit as claimed in claim 4, wherein, for basic positioning of the substrate on the pump housing, the further retaining region has a blind hole, in which an internal thread is produced by the self-forming or self-cutting thread of the screw after the placement of the substrate on the pump housing.

6. The hydraulic unit as claimed in claim 5, wherein the inside dimension of the through hole and an inside dimension of the blind hole are each reduced in inside diameter relative to the nominal size of the blind hole and of the through hole, respectively, in the respective retaining regions, to allow the formation of the threads.

7. The hydraulic unit as claimed in claim 1, wherein an adhesive joint is provided between the motor housing and the pump housing in addition to the screwed basic positioning of the motor housing on the pump housing.

8. The hydraulic unit as claimed in claim 1, wherein an adhesive joint is provided between the pump housing and the substrate in addition to the screwed basic positioning of the substrate on the pump housing.

9. The hydraulic unit as claimed in claim 8, wherein, the adhesive joint is embodied so as to be impermeable to liquid.

10. The hydraulic unit as claimed in claim 1, further comprising an inserted seal provided between the motor housing and the pump housing.

11. The hydraulic unit as claimed in claim 1, further comprising an inserted seal provided between the substrate and the pump housing.

12. The hydraulic unit as claimed in claim 1, wherein the light metal is an extruded aluminum section.

13. The hydraulic unit as claimed in claim 7, wherein the adhesive joint is embodied so as to be impermeable to liquid.

* * * * *